Patented Oct. 7, 1941

2,258,400

UNITED STATES PATENT OFFICE 2,258,400

ALKYLCARBONATE ESTERS OF DIBENZANTHRONE AND ISODIBENZANTHRONE COMPOUNDS AND PROCESS OF MAKING THEM

Alexander J. Wuertz, Wilmington, Del., and Edward C. Tobin, Woodstown, N. J., assignors to E. I. du Pont de Nemours & Company, Wilmington, Del., a corporation of Delaware No Drawing. Application October 7, 1939, Serial No. 298,398

10 Claims. (Cl. 260—353)

This invention relates to the preparation of new color compounds of the anthraquinone class.

The dyes of the anthraquinone class are relatively stable compounds and in general exhibit better all around fastness properties than the majority of dyes of many other classes. Wherever a new problem arises which requires a color of good fastness properties the dyes of the anthraquinone class are usually considered. Within this class the dibenzanthrone colors, under which term we include the isodibenzanthrone compounds, are of particular importance because of their desirable shades and fastness properties. These dyes, however, are water and oil insoluble compounds and therefore are not suitable for coloring many materials where oil or solvent soluble colors are required. A number of derivatives of the known anthraquinone colors have been prepared that show some oil or solvent solubility but in general those heretofore disclosed show relatively poor stability when dissolved in oils and when subjected to light or to air or they are not sufficiently soluble to give deep shades. Colors which are soluble in solvents such as the hydrocarbon solvents and similar solvents are used, not only for coloring oils, gasolines, and other fuels, but are also required in the coloring of artificial resins, plastics of various kinds, lacquers, cellulose derivatives, etc., and a diligent search is being made for stable derivatives of the anthraquinone dyes which can be used for such purposes.

It is therefore an object of this invention to provide a new series of oil and solvent soluble colors from colors of the dibenzanthrone class, including the isodibenzanthrone compounds, which are stable under ordinary conditions and which can be used for coloring oils, fats, waxes, gasolines, petroleum hydrocarbon fractions of all types, organic solvents, artificial resins, plastics, cellulose derivatives, etc., in strong bright shades with a desirable fluorescence.

It is a further object of the invention to prepare new alkylcarbonate esters of dibenzanthrone and isodibenzanthrone compounds which are oil and solvent soluble, and which are relatively stable to light and air oxidation when dissolved in oils, solvents, etc., and which color such materials in strong bright shades.

It is a further object of the invention to provide a process for preparing new alkylcarbonate esters of dibenzanthrone and isodibenzanthrone compounds by reacting hydroxy dibenzanthrone and isodibenzanthrone compounds with alkylchlorocarbonates under substantially anhydrous conditions.

It is a further object of the invention to provide a method for separating hydroxy-containing dibenzanthrone or isodibenzanthrone compounds from compounds of the same class which do not contain free hydroxyl groups by reacting the mixture of dibenzanthrone or isodibenzanthrone compounds with alkylchlorocarbonates to form oil or solvent soluble derivatives which may be separated from the oil insoluble dyestuff and be hydrolyzed back to the parent compound, or be employed as the alkylcarbonate esters for the coloring of oils, solvents, etc.

We have found that a new and valuable series of oil and solvent soluble colors can be produced by reacting hydroxy dibenzanthrone and hydroxy isodibenzanthrone compounds with alkylchlorocarbonates under conditions which give stable ester derivatives. According to our process leuco dibenzanthrone or isodibenzanthrone compounds or free hydroxyl containing dibenzanthrone or isodibenzanthrone compounds are reacted with the alkylchlorocarbonates under substantially anhydrous conditions. Where the oil or solvent derivatives of dibenzanthrone or isodibenzanthrone dyestuffs which do not contain free hydroxyl groups are to be produced, the dyestuff in keto form is preferably reacted with pyridine and zinc in an organic solvent, the alkylchlorocarbonate is then added and the mass is heated at temperatures of from 50 to 150° C. Where a free hydroxyl containing dyestuff of the dibenzanthrone and isodibenzanthrone series is to be esterified the reaction is also carried out in an organic solvent, preferably in the presence of an acid binding agent such as pyridine. By reducing the keto groups of the hydroxy dibenzanthrone compound to the leuco form additional alkylcarbonate ester groups may be introduced into the molecule, so that from dihydroxydibenzanthrone a tetra alkylcarbonate ester is produced.

This process also provides a method for separating out hydroxyl containing derivatives such as incompletely alkylated compounds, degradation or hydrolysis products, etc., from the alkyl ethers of dihydroxydibenzanthrone. After the alkylation of the dihydroxydibenzanthrone compounds is carried to the normal state of completion the hydroxyl containing impurities may be rendered solvent soluble by reacting the mass with an alkylchlorocarbonate. The solvent insoluble dye may then be filtered off from the resulting solvent solution of the impurities. The alkylcarbonate esters remaining in the solvent, if of sufficient purity may be employed as oil or solvent soluble colors, or they may be hydrolyzed back to the parent dyestuff for reuse. In a similar manner hydroxydibenzanthrone compounds may be purified from non-hydroxy derivatives by esterifying and after filtering off solvent insoluble impurities they may be hydrolyzed back to the parent compound.

The reaction of the hydroxydibenzanthrone compounds and the alkyl chlorocarbonate is carried out in solvents such as orthodichlorobenzene, monochlorobenzene, tetrachloroethylene, toluene, etc. The oil soluble compounds are isolated by steam distilling the solvent from the reaction mass and filtering off the color, washing preferably with a small amount of alcohol to facilitate drying and then drying the filter cake. The products may be purified by dissolving in solvents such as petroleum naphtha, filtering, and again isolating by steam distilling, etc., in the same manner as above described. Where the higher alkylchlorocarbonates are employed the higher alcohols, which are regenerated during the reaction and which are normally solids, may be conveniently removed by using isopropyl alcohol as a solvent for the higher alcohols.

The alkylchlorocarbonates in which the alkyl group contains from 1 to 18 carbon atoms have been found to give oil and solvent soluble dibenzanthrone and isodibenzanthrone derivatives. In general, the longer the alkyl chain the greater the solubility of the resulting carbonate ester in oils and hydrocarbon solvents. The solubility, however, is also varied in some degree by other substituents on the dibenzanthrone molecule, although all show sufficient solubility even in petroleum oils to give strong colored solutions exhibiting a strong fluorescence. As illustrative of the alkylchlorocarbonates which may be employed are methylchlorocarbonate, ethylchlorocarbonate, N-amylchlorocarbonate, hexylchlorocarbonate, heptylchlorocarbonate, commercial mixtures such as commercial lauryl chlorocarbonate which contains several closely related alkylchlorocarbonates, or others prepared from commercial higher alcohols. In a similar manner the alkylchlorocarbonates prepared from high molecular weight unsaturated aliphatic alcohols may also be employed. Alkylchlorocarbonates containing more than 18 carbon atoms in the side chain may of course be used if available although it will be recognized that octadecyl alcohol is one of the highest commercially available alcohols, and that the corresponding octadecylchlorocarbonate is typical of its higher homologues.

The following examples are given to further illustrate the invention. The parts used are by weight.

*Example 1.*—48.2 parts of dry, pulverized dibenzanthrone, 54.8 parts of pyridine, (dry and distilled), 19.72 parts of zinc dust, and 438 parts of ortho-dichloro-benzene are mixed together and heated to 50° C. 96.4 parts of octadecylchlorocarbonate in 219 parts of ortho-dichlorobenzene are slowly added over a two hour period keeping the temperature below 60° C. The temperature is then arised to 100° C. and held at this temperature for 2 hours. The temperature is then raised to 120° C. over a ½ hour period. 25 parts of sodium carbonate are added and the charge is steam distilled until solvent free. It is then filtered and washed alkali-free and dried at around 100° C. It may be washed with a small amount of alcohol to hasten the drying.

The product obtained above is dissolved in 600 parts of petroleum naphtha (B. R. 150–190° C.) and filtered at 100° C. The cake is washed with 200 parts of petroleum naphtha. Twenty-five parts of sodium bicarbonate are added to the filtrate which is then steamed solvent free. The charge is filtered, washed alkali-free and dried. It may be washed with a small amount of ethyl alcohol to hasten the drying. The dried product is then slurried in 1000 parts isopropyl alcohol for several hours. The charge is filtered, and the product is washed with a small amount of ethyl alcohol and dried.

The red-brown colored stable carbonic ester, thus obtained as a dry powder, is soluble in oils, gasoline, and many other kinds of organic material and solvents with a red color in transmitted light, exhibiting a very strong and bright yellowish-green fluorescence in reflected light. It is stable when in oil or organic solvent solutions even when exposed to sunlight and to air oxidation. It is only slightly soluble in alcohol and is insoluble in water. The compound is the di(octadecylcarbonate) of leuco-dibenzanthrone of the formula:

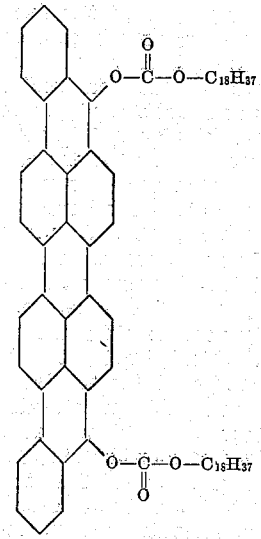

*Example 2.*—700 parts of ortho-dichloro-benzene, 100 parts of dimethoxy-dibenzanthrone, 40 parts of pyridine, and 35 parts of powdered zinc are mixed together and heated to 50° C. 60 parts of ethyl chlorocarbonate in 130 parts of ortho-dichloro-benzene are slowly added over a two-hour period keeping the temperature below 65° C. The temperature is raised to 75° C. and maintained for 3 hours. The temperature is then raised to 100° C. and held for ½ hour. 25 parts of sodium carbonate are added and the charge steamed solvent free. The cake is then filtered, washed alkali-free and dried. The product is dissolved in 4210 parts of solvent naphtha and filtered at 90° C. 25 parts of sodium bicarbonate are added to the filtrate which is then steamed solvent free. The remaining mass is then filtered, washed alkali free and dried.

The brownish to olive colored di-ethyl-carbonate ester of leuco dimethoxydibenzanthrone thus obtained as a dry powder is soluble in oils, fats, waxes, gasoline, organic solvents, etc., with an orange color in transmitted light, exhibiting a very powerful and stable yellowish-green fluorescence in reflected light. When dissolved in these materials it shows excellent stability.

*Example 3.*—350 parts of ortho-dichloro-benzene, 50 parts of the condensation product of dihydroxydibenzanthrone with 1:3-dichlorobutene, disclosed in U. S. Patent application, Serial Number 251,962, now U. S. Patent 2,218,663, issued Oct. 22, 1940, 20 parts of pyridine, and 17.5 parts of zinc dust are mixed together and heated to 50° C. 30 parts of ethylchlorocarbonate in 50 parts of ortho-dichloro-benzene are slowly added over ½ hour keeping the temperature below 65° C. The temperature is then raised to 75° C. and maintained for 3 hours and then raised to 100° C. in the following ½ hour. The charge is filtered at 100° C. and 25 parts of sodium carbonate are added to the filtrate which is then steam distilled free from solvent. The product is then filtered, washed alkali free and dried. It may be further purified as shown in Example 2. The green colored stable ethyl carbonate ester thus obtained as a dry powder is soluble in oils, gasoline, etc., with a wine color, exhibiting a very strong and bright yellowish-olive fluorescence in reflected light. The solubility and stability properties of this product are similar to those of the product obtained in Example 2.

*Example 4.*—350 parts of ortho-dichloro-benzene, 50 parts of a dichloroisodibenzanthrone (prepared by direct chlorination of isodibenzanthrone in nitrobenzene), 20 parts of pyridine, and 17.5 parts of zinc dust are mixed together and heated to 50° C. 30 parts ethylchlorocarbonate in 50 parts ortho-dichloro-benzene are dripped in over ½ hour period keeping the temperature below 65° C. The temperature is then raised to 75° C. and maintained for 3 hours. The charge is filtered, and after the addition of 25 parts of sodium carbonate it is steamed solvent free, filtered, washed alkali-free and dried. The product may be further purified as described in Example 2 if desired. The red-brown colored stable diethylcarbonate ester thus obtained as a dry powder exhibits similar solubility and stability properties to the product obtained in Example 1 being a little more red in transmitted light, but similar in reflected light.

*Example 5.*—100 parts of ortho-dichlorobenzene, 10 parts of Bz2,Bz2'-dimethoxydibenzanthrone, 4 parts of pyridine, and 4.5 parts of zinc dust are mixed together and heated to 50° C., 6.0 parts of methylchlorocarbonate in 26 parts ortho-dichlorobenzene are slowly added over ½ hour period keeping the temperature below 50° C. The temperature is raised to 75° C. and maintained for 3 hours, then raised to 100° C. and held for ½ hour. The charge is filtered at 100° C., 5 parts of sodium carbonate are added to the filtrate and the solvent removed by steam distillation. The dyestuff is filtered off, washed alkali-free, and dried.

*Example 6.*—110 parts of ortho-dichlorobenzene, 9.12 parts of dibenzanthrone, 4.35 parts of pyridine, and 3.58 parts of zinc powder are mixed together and heated to 50° C. 8.55 parts of n-amylchlorocarbonate in 10 parts ortho-dichlorobenzene are added over a ½ hour period keeping the temperature below 50° C. The temperature is raised to 100° C. and held with agitation for 2 hours. The product is filtered at 100° C. and 5 parts of soda ash are added to the filtrate which is then steam distilled solvent free. The resulting slurry is filtered, washed alkali-free and dried. The resulting product when dissolved in oils, or solvents exhibits substantially the same color in direct and reflected light as the product of Example 1. It is, however, somewhat less soluble than the octadecyl derivative.

*Example 7.*—25 parts of dihydroxydibenzanthrone and 10 parts zinc powder are stirred in a mixture of 200 parts of o-dichlorobenzene and 10 parts of pyridine. 25 parts of ethylchlorocarbonate are slowly run into the reaction vessel at room temperature after which the temperature is raised to 80° C. and held while stirring for one hour, or until a sample taken shows complete solubility in o-dichloro-benzene. The dark olive-green solution is immediately filtered and steam distilled free of solvent, then filtered and washed free from salts with water. The product is dried at 90° to 100° C. The tetra-carbethoxy ester is obtained in good yield as a water insoluble, dark reddish-brown powder soluble in methyl alcohol, ethyl alcohol, benzene, toluene, lubricating oils, etc. It dissolves in such solvents with a bright orange color and exhibits a strong greenish-yellow fluorescence in reflected light.

*Example 8.*—25 parts of dihydroxydibenzanthrone are stirred in a mixture of 200 parts of o-dichlorobenzene and 20 parts pyridine. 25 parts ethylchlorocarbonate are slowly run into the mixture while stirring at room temperature after which the temperature is raised to 100° C. and held while stirring for one hour, or until a sample taken shows complete solubility in o-dichlorobenzene. The dark red solution is immediately filtered and the filtrate is steam distilled free of solvent. The product is filtered, washed free from salts with water and dried at 90°–100° C. The dicarbethoxy ester is obtained in good yield as a water insoluble dark reddish-brown powder which is soluble in methyl alcohol, ethyl alcohol, benzene, toluene, lubricating oils, etc. When dissolved in such solvents it exhibits a red-violet color with a strong orange-red fluorescence.

The proportions of solvent, pyridine, zinc and alkylchlorocarbonates employed in the above examples may of course be varied within reasonable limits. At least the amount of alkylchlorocarbonate equal to that theoretically necessary to produce the desired ester should of course be used. Even where all hydroxyl groups are to be esterified a large excess of the alkylchlorocarbonate should not be used for the unreacted dibenzanthrone compounds being insoluble in the cold solvents are more readily removed from the reaction mass.

The following examples illustrate the purification of dibenzanthrone compounds by the formation of these new oil and solvent soluble derivatives which may be removed and employed as such, or regenerated to the parent materials for reuse, if found desirable.

*Example 9.*—One part of the crude dye obtained from the condensation of 1:3-dichloro-2-butene with Bz2,Bz2'-dihydroxy-dibenzanthrone according to Example 3 of copending application Serial No. 251,962 is suspended in 4 parts of nitrobenzene and 0.25 part of dry pyridine is added. The mass is heated under agitation to 80–85° C. and 0.3 part of ethylchlorocarbonate is dropped in at this temperature during a period of one half hour. The suspension is then stirred at 125–130° C. for 2 hours, and is finally allowed to cool to room temperature and filtered. The cake is washed with 1 part of nitrobenzene and steam distilled solvent-free in the presence of soda ash. The purified dye is filtered off, washed alkali-free and dried. The resulting vat dyestuff dyes cotton in much stronger and brighter blue shades than does the starting material, showing that extensive purification has been accomplished.

*Example 10.*—The crude reaction mass obtained according to Example 3 of copending patent application Serial No. 251,962 now U. S. Patent 2,218,663, issued Oct. 22, 1940 by reacting 50 parts of the "soda ash salt" of Bz2,Bz2'-dihydroxydibenzanthrone with 150 parts of 1,3-dichloro-2-butene in the presence of 40 parts of sodium acetate, and then distilling off the excess 1,3-dichloro-2-butene is suspended in 150 parts of nitrobenzene. Twenty parts of dry pyridine are added to the mass, which is then heated under agitation to 80–85° C. and 20 parts of ethylchlorocarbonate are added during one half hour. Then the charge is stirred at 125–130° C. for 2 hours. At the end of this time the mass is cooled to room temperature and filtered. The cake is washed with 40 parts of nitrobenzene, then steam distilled free from nitrobenzene in the presence of soda ash. The purified dye is filtered off, washed alkali-free and dried. The product is identical with that obtained in Example 9.

*Example 11.*—Twenty parts of dry pyridine are added to the crude reaction mass obtained according to Example 1 of U. S. P. 2,140,455 by alkylating 40 parts of Bz2,Bz2'-dihydroxydibenzanthrone with 48 parts of dimethyl sulfate in the presence of 105 parts of potassium carbonate, using 400 parts of nitrobenzene as the reaction medium. The suspension of the crude Bz2,Bz2'-dimethoxy-dibenzanthrone is heated under agitation to 80–85° C., and 20 parts of ethylchlorocarbonate are added during one half hour. The mixture is then heated to 125–130° and held at this temperature for 2 hours. At the end of this time the mass is cooled to room temperature and filtered. The cake is washed with 40 parts of nitrobenzene, then steam distilled solvent-free in the presence of soda ash. The purified dye is filtered off, washed free from alkali, and dried. The product dyes cotton in bright green shades and possesses excellent fastness properties.

*Example 12.*—Fifty parts of the crude dye prepared according to Example 3 of copending patent application Serial No. 251,961 filed Jan. 20, 1939, by the condensation of 1,3-dibromobutane with Bz2,Bz2'-dihydroxydibenzanthrone are suspended in 250 parts of nitrobenzene and 20 parts of dry pyridine added. The mass is heated to 80–85° C. under agitation, and 20 parts of ethylchlorocarbonate are dropped in during one half hour at this temperature. The mixture is then stirred at 125–130° C. for 2 hours, at the end of which time it is cooled to room temperature and filtered. The cake is washed with 50 parts of nitrobenzene, then with alcohol to remove the nitrobenzene, and finally with water until it is alkali-free. The cake is then dried. The purified product yields fast, blue green dyeings on cotton.

As illustrated above temperatures of from 50 to 150° C. should be employed in carrying out the esterification reaction. While higher temperatures may be used in many instances, in others, particularly when working with the alkyl ethers of dibenzanthrone, some decomposition of the ether groups takes place. At lower temperatures the reaction time is unnecessarily increased.

The new alkylcarbonate esters of the dibenzanthrone and isodibenzanthrone compounds can be regenerated with alkalies particularly in the presence of a water soluble solvent such as alcohol.

As pointed out above, the new oil and solvent soluble colors possess a strong and persistent fluorescence so that they may be used in the coloring of oils, mineral oils, petroleum hydrocarbon oil fractions, waxes, resins, plastic masses, cellulose products, lacquers, etc., where solvent soluble colors are employed, particularly in obtaining novel and artistic color effects. Because of their property, when dissolved in oils and solvents, of exhibiting fluorescence when acted upon by ultra violet light they are also suitable for use in producing color effect with such invisible light.

Because of their excellent stability they are particularly suitable for use in petroleum oils which contain usual antioxidants, pour point depressants, viscosity index improvers, extreme pressure lubricant bases, sludge dispersing agents, inhibitors, etc. which modifying agents are employed in present day commercial hydrocarbon oils. They may also be used in coloring gasolines and other petroleum hydrocarbon fractions in conjunction with ignition control agents and other fuel modifiers.

We claim:

1. An alkylcarbonate ester of a compound of the dibenzanthrone and isodibenzanthrone series.

2. An alkylcarbonate ester of a leuco dibenzanthrone compound.

3. An alkylcarbonate ester of a leuco dialkyloxydibenzanthrone compound.

4. A di-alkylcarbonate ester of a leuco dibenzanthrone compound.

5. A di-alkylcarbonate ester of a leuco dialkyloxydibenzanthrone compound.

6. The di-octadecylcarbonate ester of leuco dibenzanthrone.

7. The di-ethylcarbonate ester of leuco Bz2, Bz2'-dimethoxy-dibenzanthrone.

8. The tetra-ethylcarbonate ester of leuco Bz2, Bz2'-di-hydroxy-dibenzanthrone.

9. The process for preparing new alkylcarbonate esters of dibenzanthrone compounds which comprises reacting a hydroxyl containing dibenzanthrone compound with an alkylchlorocarbonate in an organic solvent under substantially anhydrous conditions.

10. In the process for separating hydroxy dibenzanthrone compounds from other dibenzanthrone compounds with which they may occur, the steps which comprise reacting the hydroxydibenzanthrone containing material with an alkylchlorocarbonate in an organic solvent and under substantially anhydrous conditions and filtering off any unreacted solvent insoluble material that may remain after the reaction is completed.

ALEXANDER J. WUERTZ.
EDWARD C. TOBIN.